United States Patent
Rogers Agent et al.

(10) Patent No.: US 7,473,439 B2
(45) Date of Patent: Jan. 6, 2009

(54) COATED POLYMERIC FILMS AND COATING SOLUTIONS FOR USE WITH POLYMERIC FILMS

(75) Inventors: Rhonda E. Rogers Agent, Rochester, NY (US); Bruno R. L. Gringoire, Rachecourt (BE)

(73) Assignee: ExxonMobil Oil Corporation, Irving, TX (US)

( * ) Notice: Subject to any disclaimer, the term of this patent is extended or adjusted under 35 U.S.C. 154(b) by 230 days.

(21) Appl. No.: 11/203,844

(22) Filed: Aug. 15, 2005

(65) Prior Publication Data

US 2007/0036999 A1 Feb. 15, 2007

(51) Int. Cl.
*B05D 1/40* (2006.01)
*B01D 3/02* (2006.01)

(52) U.S. Cl. .................... 427/372.2; 427/331; 427/384; 427/385.5; 427/388.1; 427/388.2; 427/388.4

(58) Field of Classification Search ........................ None
See application file for complete search history.

(56) References Cited

U.S. PATENT DOCUMENTS

| | | | |
|---|---|---|---|
| 4,058,645 A | 11/1977 | Steiner | |
| 4,058,649 A | 11/1977 | Steiner | |
| 4,090,344 A | 5/1978 | Kelly | |
| 4,240,993 A * | 12/1980 | Sun | 264/456 |
| 4,403,464 A | 9/1983 | Duncan | |
| 4,671,047 A | 6/1987 | Mugnai | |
| 4,807,420 A | 2/1989 | Barker | |
| 4,853,602 A | 8/1989 | Hommes et al. | |
| 4,937,112 A | 6/1990 | Schirmer | |
| 5,487,940 A | 1/1996 | Bianchini et al. | |
| 5,491,009 A | 2/1996 | Bekele | |
| 5,508,113 A | 4/1996 | Knoerzer | |
| 5,512,338 A | 4/1996 | Bianchini et al. | |
| 5,525,421 A | 6/1996 | Knoerzer | |
| 5,547,764 A | 8/1996 | Blais et al. | |
| 5,552,212 A | 9/1996 | Knoerzer | |
| 5,604,042 A | 2/1997 | Bianchini et al. | |
| 5,731,093 A | 3/1998 | Chang et al. | |
| 5,776,618 A | 7/1998 | Lu | |
| 5,827,615 A | 10/1998 | Touhsaent et al. | |
| 5,885,721 A | 3/1999 | Su et al. | |
| 6,168,826 B1 | 1/2001 | Su et al. | |
| 6,420,041 B1 | 7/2002 | Amon et al. | |
| 6,444,750 B1 | 9/2002 | Touhsaent | |
| 6,472,470 B1 | 10/2002 | Fujiwara et al. | |
| 6,500,559 B2 | 12/2002 | Hofmeister et al. | |
| 6,503,588 B1 | 1/2003 | Hayashi et al. | |
| 6,511,688 B2 | 1/2003 | Edwards et al. | |
| 6,524,720 B1 | 2/2003 | Shah | |
| 6,579,621 B1 | 6/2003 | Shah | |
| 6,599,639 B2 | 7/2003 | Dayrit et al. | |
| 6,794,042 B1 | 9/2004 | Merlin et al. | |
| 6,794,050 B2 | 9/2004 | Peiffer et al. | |
| 6,794,051 B2 | 9/2004 | Peiffer et al. | |
| 6,858,313 B2 | 2/2005 | Musco et al. | |
| 6,869,686 B1 | 3/2005 | Idlas | |
| 6,872,459 B2 | 3/2005 | Frisk et al. | |
| 6,884,480 B2 | 4/2005 | Bradfute et al. | |

* cited by examiner

*Primary Examiner*—Sheeba Ahmed
(74) *Attorney, Agent, or Firm*—Darryl Tyus

(57) ABSTRACT

Polymeric film structures incorporating at least one coating comprising a cross-linked EVOH copolymer and coating solutions suitable for use on polymeric films comprising at least one EVOH copolymer and at least one cross-linker are provided. The coated films may be single or multi-layered film structures. The films may also be metallized. The coated films exhibit beneficial water vapor and oxygen transmission rates. The coated films may also exhibit the beneficial barrier characteristics under conditions of high humidity. The coated films are suitable for packaging applications. The coating solutions exhibit beneficial stability characteristics over extended time periods.

16 Claims, 3 Drawing Sheets

Humidity Effect on OTR

COATED POLYMERIC FILMS AND COATING SOLUTIONS FOR USE WITH POLYMERIC FILMS

FIELD OF THE DISCLOSURE

This disclosure relates to coated polymeric films, processes for producing coated polymeric films, packages produced from coated polymeric films, and coating solutions suitable for use on polymeric films.

BACKGROUND OF THE DISCLOSURE

Polymeric films are useful in a wide variety of applications, particularly for use in packaging products. Besides exhibiting the ability to be processed on high speed equipment such as form/fill/seal machines, an important consideration in designing certain packaging films is the ability to provide barrier properties. In particular, water and oxygen barrier properties are often important considerations for packaging films.

There are two general types of form/fill/seal methods. In a horizontal form/fill/seal apparatus, individual pouches or packages are formed by folding the multi-layer film and providing horizontal and/or vertical seals along the length of the folded web, depending upon whether the packaging is along a horizontal packaging line such as for box overwrap, or along a pouch line for forming a pouch. The individual packages may typically be separated at a seal area. Optionally, the bottoms of the pouches or packages can also be sealed. After the pouch or package is formed and filled, the top of the pouch or package is sealed. Similarly, in vertical form/fill/seal apparatus, the continuous web is formed around a tube and the web is immediately joined together by a longitudinal vertically oriented sealing jaw as either a lap seal or a fin seal and transversely along the top and bottom margins of the bag or package. For purposes herein, the term package or packaging may be defined broadly to encompass horizontal formed overwrap packages, pouches, vertically formed packages, and bags. For additional information regarding such packaging systems, see U.S. Pat. No. 4,671,047 to Mugnai; U.S. Pat. No. 4,807,420 to Barker; U.S. Pat. No. 4,090,344 to Kelly; and U.S. Pat. No. 4,937,112 to Schirmer.

It is known to provide metallic layers or coatings on the surface of polymeric films to provide barrier properties. The metallic layers may be used on polymeric films used in form/fill/seal applications as well as a vide variety of other polymeric film applications such as pouches and bags. A metallic layer or coating is typically applied by vapor deposition methods. U.S. Pat. No. 5,487,940 to Bianchini et al. and U.S. Pat. No. 6,420,041 to Amon et al. describe and refer to numerous exemplary metallized films. Metal layers are well known in the packaging industry and can be deposited using any known method, for instance, vacuum deposition, electroplating, sputtering, etc. In many applications, the metal layer is one of vacuum deposited aluminum, copper, silver, chromium, gold, and mixtures thereof, with vacuum deposited aluminum being the most commonly used. Metallized films are widely used for their moisture barrier properties.

Various coatings are also applied to the surface of polymeric films to enhance barrier properties. Acrylic-containing coatings that offer barrier properties are known. An acrylic coating may be applied to one side of a film substrate and another heat sealable coating, such as polyvinylidene chloride (PVdC), or another acrylic coating, is coated on the other side of the film substrate. Acrylic-containing coating formulations provide films with a good coefficient of friction which contributes to good machinability characteristics. Acrylic-based coatings also provide films with good barrier characteristics which improve flavor and aroma protection. Such coatings are described in U.S. Pat. No. 4,058,649 to Steiner and U.S. Pat. No. 4,058,645 to Steiner. The PVdC coating or other type of acrylic coating is usually on the inside (e.g., the product side) of the film and provides high seal strength, good hot tack characteristics and barrier properties. These heat sealable coatings have glass transition ("Tg") temperatures which are higher than room temperature. Such a coated film is disclosed in U.S. Pat. No. 4,403,464 to Duncan.

Polymeric films may also be provided with coatings incorporating polymers such as ethylene vinyl alcohol ("EVOH") co-polymers and polyvinyl alcohol ("PVOH") co-polymers. U.S. Pat. No. 6,472,470 to Fujiwara, et al. discloses EVOH copolymers that are described as having excellent thermal stability, water resistance, and gas-barrier properties. The EVOH copolymers are prepared as aqueous coating solutions. The aqueous solutions are described as having good stability when allowed to stand for a long time at low temperatures. U.S. Pat. No. 5,827,615 to Touhsaent et al. discloses the use of EVOH copolymer layers in film structures.

U.S. Pat. No. 5,547,764 to Blais, et al. discloses the use of solutions incorporating at least two PVOH co-polymers having differing degrees of hydrolysis. The solutions are used to provide coatings for producing films exhibiting low oxygen transmission characteristics. The solutions may include a cross-linking agent. Oxygen transmission rates at 0% relative humidity and 75% relative humidity are disclosed. Solutions of the PVOH co-polymers are described as exhibiting improved pot life and shelf life. In certain Examples, a PVOH solution with a pot life of about 72 hours is disclosed. Other cross-linked PVOH solutions and coatings are disclosed in U.S. Pat. No. 5,512,338 to Bianchini et al. and U.S. Pat. No. 5,604,042 to Bianchini et al. Additional PVOH co-polymer solutions and coatings are disclosed in U.S. Pat. No. 5,508,113 to Knoerzer; U.S Pat. No. 5,525,421 to Knoerzer; U.S Pat. No. 5,547,764 to Blais et al.; U.S. Pat. No. 5,552,212 to Knoerzer; U.S Pat. No. 5,731,093 to Chang et al.; and U.S. Pat. No. 6,444,750 to Touhsaent.

Coating solutions and coatings incorporating a vinyl alcohol/amine copolymer are disclosed in U.S. Pat. No. 5,776,618 to Lu.

BRIEF DESCRIPTION OF THE DISCLOSURE

This disclosure relates to polymeric film structures incorporating at least one coating comprising a cross-linked EVOH copolymer, packages produced from the coated polymeric films, processes for producing the coated polymeric films, and coating solutions suitable for use on the polymeric films. The coated films may be single or multi-layered film structures. The films may also be metallized, including structures in which a metallized layer is deposited on the coating comprising the cross-linked EVOH copolymer. The coated films exhibit beneficial water vapor and oxygen transmission rates. The coated films may also exhibit the beneficial barrier characteristics under conditions of high humidity. The coating solutions exhibit beneficial pot life and stability characteristics over extended time periods.

DETAILED DESCRIPTION OF THE DISCLOSURE

Figure 1:
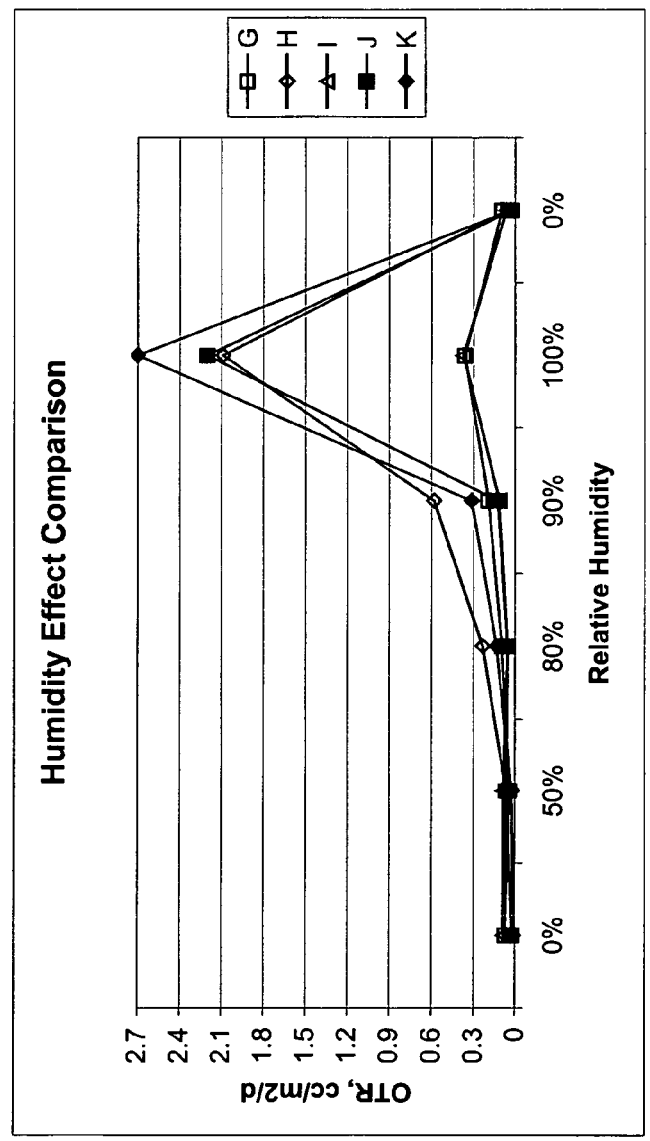
FIG. 1 reports the data collected from the oxygen transmission rates for the different films as well as providing a graph of the reported oxygen transmission rates at the different relative humidities.

This disclosure relates to coated polymeric films, processes for producing coated polymeric films, packages produced from coated polymeric films, and coating solutions suitable for use on polymeric films. The coated films described herein exhibit beneficial resistance to water vapor and oxygen transmission. In particular, films in which a metallized layer is applied over the coating exhibit beneficial resistance to water vapor and oxygen transmission. In embodiments in which the EVOH copolymer coating is not metallized, the films described may exhibit beneficial oxygen barrier properties.

The coated films described herein also exhibit beneficial aroma barrier properties, improved optics, improved printability, and metal adhesion. One optical feature that may be present with the coated films described herein is a unique appearance of a metallized layer deposited onto the EVOH copolymer coating. Generally, metallized layers applied to conventional EVOH copolymer coatings have a "milky" appearance. It has been discovered that metallic layers placed on the cross-linked EVOH copolymer coatings described herein may exhibit a "shiny" appearance as compared to metallic layers applied to conventional EVOH copolymer coatings.

Because of these many advantages, the coated films described herein are suitable for use in a broad range of applications, including a wide variety of packaging uses. Exemplary products that may be packaged using the EVOH copolymer coated films described herein include confections, cereals, muesli bars, crackers, biscuits, wafers, snacks, other dry foods, and para-pharmaceuticals.

Although EVOH copolymer film coatings are known, it has been found that conventional EVOH coatings suffer a decline in resistance to water vapor and oxygen transmission at high humidity levels. In certain embodiments, the metallized versions of the coated films described herein exhibit improved resistance to humidity and water vapor. In certain embodiments, the metallized and non-metallized versions of the coated films described herein exhibit improved resistance to oxygen transmission at high humidity levels as compared to conventional EVOH coated films. Moreover, the EVOH copolymer coating solutions used to produce the coated films described herein exhibit increased stability characteristics compared to conventional coating solutions. The coating solutions described herein may be stored for long time periods without loss of desirable viscosity characteristics.

The coated films described herein include at least one coating comprising a cross-linked EVOH copolymer. This disclosure also relates to coating solutions suitable for coating onto polymeric films useful for producing the coated films described herein. The coatings comprise a cross-linked EVOH copolymer.

The coated films described herein may be single or multi-layered film structures. The coating may be applied to polymeric substrates having other coatings or overlayers such as a metallized layer. In certain embodiments, the films described herein include a polymeric substrate having at least one coating layer comprising a cross-linked EVOH copolymer applied to one surface of the substrate and a metal layer applied on top of the coating layer.

The films described herein are useful in packaging applications in which oxygen and water barrier properties are desired. The films are useful to provide protection against damage, spoiling, and staleness that may be caused by oxygen and water. The films described herein are particularly useful for production of form/film/seal packaging structures often used to package food and snack products. Exemplary useful products that may be produced from the EVOH copolymer coated films described herein include pouches and bags.

The film coatings of this disclosure incorporate at least one cross-linked EVOH copolymer comprising vinyl alcohol units and units derived from ethylene. For purposes of this disclosure, the terms "EVOH copolymer" and "ethylene vinyl copolymer" refer to polymers incorporating two or more monomers, including vinyl alcohol units and units derived from ethylene. For example, these terms, as used herein, include copolymers including units derived from ethylene and vinyl alcohol units, as well as one or more additional monomers present at levels up to 10 mol %. Exemplary additional monomers include alpha-olefins, such as propylene, 1-butene, isobutene and 1-hexene; vinyl ethers, such as methyl vinyl ether, ethyl vinyl ether, n-propyl vinyl ether, iso-propyl vinyl ether and n-butyl vinyl ether; hydroxyl group-containing vinyl ethers, such as ethylene glycol vinyl ether, 1,3-propanediol vinyl ether and 1,4-butanediol vinyl ether; allyl ethers, such as allyl acetate, propyl allyl ether, butyl allyl ether and hexyl allyl ether; monomers containing an oxyalkylene group; vinyl silanes, such as vinyltrimethoxysilane; hydroxyl group-containing alpha-olefins, such as isopropenyl acetate, 3-buten-1-ol, 4-penten-1-ol, 5-hexen-1-ol, 7-octen-1-ol, 9-decen-1-ol and 3-methyl-3-buten-1-ol; sulfonic acid group-containing monomers, such as ethylenesulfonic acid, allylsulfonic acid, methallylsulfonic acid and 2-acrylamide-2-methylpropanesulfonic acid; and cationic group-containing monomers, such as vinyloxyethyltrimethylammonium chloride, vinyloxybutyltrimethylammonium chloride, vinyloxyethyldimethylamine, vinyloxymethyldiethylamine, N-acrylamidemethyltrimethylammonium chloride, 3-(N-methacrylamide)propyltrimethylammonium chloride, N-acrylamideethyltrimethylammonium chloride, N-acrylamidedimethylamine, allyltrimethylammonium chloride, methallyltrimethylammonium chloride, dimethylallylamine, and allylethylamine.

As is the case with most commercial polyvinyl alcohol polymers, the EVOH copolymers used in the coatings described herein may be produced from precursor vinyl acetate copolymers. The synthesis of the precursor vinyl acetate copolymers may be conducted in solution, slurry, suspension or emulsion type polymerizations. When preparing poly(vinyl acetate) by suspension polymerization, for example, the monomer is typically dispersed in water containing a suspending agent such as polyvinyl alcohol and then an initiator such as peroxide is added. The unreacted monomer is removed and the polymer filtered and dried.

The hydrolysis of the vinyl acetate copolymers described herein may be accomplished using methods typically utilized for polyvinyl alcohol. Either acid or base hydrolysis or combinations thereof can be conducted to produce the copolymers described herein.

The hydrolysis often is conducted in several steps; the first step involving contacting with a catalytic amount of base such as potassium hydroxide and sodium hydroxide resulting in the hydrolysis of vinyl acetate groups.

However, for purposes of this disclosure, the method used to produce the EVOH copolymer is not important as long as the compositional characteristics described herein are satisfied.

In certain embodiments, the levels of incorporation of the ethylene monomer into the EVOH copolymers described herein (hydrolyzed vinyl acetate/ethylene copolymer) range from about 5 mol % to about 20 mol % of the ethylene derived units. In other embodiments, the ethylene units may be incorporated into the copolymers described herein at levels of about 5 mol % to about 15 mol %. In still other embodiments, the ethylene units may be incorporated into the copolymers described herein at levels of about 8 mol % to about 12 mol %.

The level of incorporation of the vinyl alcohol units in the copolymers described herein may range from about 80 mol % to about 95 mol %. In other embodiments, the vinyl alcohol units may be incorporated into the copolymers described herein at levels of about 85 mol % to about 95 mol %. In additional embodiments, the vinyl alcohol units may be incorporated into the copolymers described herein at levels of about 88 mol % to about 92 mol %. In still other embodiments, the level of incorporation of the vinyl alcohol units may range from 100% of the balance of the polymeric material not derived from ethylene in the various embodiments set forth above, to the balance of polymeric material not derived from ethylene less up to about 10 mol % of the polymeric material derived from the additional monomer units as described above.

For purposes of this disclosure, references to levels of incorporation of the vinyl alcohol units in the copolymers described herein refers to the total of the vinyl alcohol units and the non-hydrolyzed vinyl acetate units remaining in the copolymers described herein.

In certain embodiments, the level of conversion of vinyl acetate units to vinyl alcohol units is from about 75% to about 100%. In other embodiments, the level of hydrolysis is from about 80% to 99% hydrolysis. In still other embodiments, the level of hydrolysis is from 90% to 100%.

In certain embodiments, the EVOH copolymers described herein has a degree of polymerization of about 300 to about 4,000 and number average molecular weights of about 13,300 to about 400,000. In other embodiments, the EVOH copolymers described herein have a degree of polymerization of about 1600 to about 2600 and number average molecular weights of about 70,000 to about 116,000. In additional embodiments, the EVOH copolymers described herein have a degree of polymerization of about 1000 to about 2000 and number average molecular weights of about 15,000 to about 80,000.

In one embodiment, the EVOH copolymers described herein are characterized by a viscosity of between about 3 cps and about 40 cps at 4% solids and 20° C. and a pH of 4 to 7.5. In other embodiments, the copolymers described herein are characterized by a viscosity of between about 5 cps and about 20 cps at 4% solids and 20° C. and a pH of 4 to 7.5. In additional embodiments, the copolymers described herein are characterized by a viscosity of between about 10 cps and about 14 cps at 4% solids and 20° C. and a pH of 4 to 7.5.

Specific exemplary EVOH copolymers suitable for use in the coatings described herein include Exceval AQ 4105 previously commercially available from Kuraray Co., Ltd. and Exceval AQ 4104 commercially available from Kuraray Co., Ltd.

The cross-linked EVOH copolymer described herein may be prepared using a cross-linking agent and an optional catalyst to facilitate cross-linking. Any suitable cross-linking agent and catalyst, if selected, may be used to produce the cross-linked EVOH copolymers described herein. Exemplary cross-linking agents may be selected from melamine-formaldehyde and urea-formaldehyde resins. Specific suitable cross-linking agents include PAREZ 613, a methylated melamine formaldehyde and PAREZ 707, a modified melamine formaldehyde, CYMEL 373 and CYMEL 385, methylated melamine formaldehydes, and CYMEL 401, a trimethelol melamine urea formaldehyde, all commercially available form Cytec Industries; glyoxal; and borax. In certain embodiments, the cross-linking agent is glyoxal that may be used without a catalyst.

The catalyst may be any catalyst suitable for initiating a cross-linking reaction between the EVOH copolymer and the cross-linking agent. For example, any of a wide variety of acid catalysts is suitable. Specific exemplary catalysts are ammonium sulfate, ammonium chloride, ammonium nitrate, phosphoric acid, maleic acid, sulfuric acid, or nitric acid.

In certain embodiments, the cross-linking agent may be present in the EVOH copolymer solutions and the EVOH copolymer coatings at a concentration of about 0.1 phr to about 25 phr by weight based upon the weight of the EVOH copolymer. In other embodiments, the cross-linking agent may be present in the EVOH copolymer solutions and the EVOH copolymer coatings at a concentration of about 10 phr to about 22 phr by weight based upon the weight of the EVOH copolymer. In additional embodiments, the cross-linking agent may be present in the EVOH copolymer solutions and the EVOH copolymer coatings at a concentration of about 20 phr to about 22 phr by weight based upon the weight of the EVOH copolymer.

One of the advantages of the EVOH copolymer solutions described herein is that the solutions may be formed with water as the only solvent. EVOH copolymer solutions of this type are referred to here as 100% aqueous EVOH copolymer solutions. This makes the EVOH copolymer solutions described herein particularly suitable for use in food contact applications. Moreover, the use of water as the solvent results in cost and waste disposal advantages. Although the EVOH copolymer solutions described herein may be prepared by using water as the only solvent, it is within the contemplation of this disclosure that the EVOH copolymer solutions may be prepared with a combination of water and one or more other solvents. In particular, the EVOH solutions described herein may include one or more solvents other than water at concentrations up to about 20 wt. % of the total solvent in the EVOH copolymer solution. In certain embodiments, the EVOH copolymer solutions described herein may include one or more solvents other than water at concentrations of about 1 wt. % to about 20 wt. % of the total solvent content in the EVOH copolymer solutions. In other embodiments, the EVOH copolymer solutions described herein may include one or more solvents other than water at concentrations of about 5 wt. % to about 15 wt. % of the total solvent content in the EVOH copolymer solutions. In still other embodiments, the EVOH copolymer solutions described herein may include one or more solvents other than water at concentrations of about 5 wt. % to about 10 wt. % of the total solvent content in the EVOH copolymer solutions. In certain embodiments, the solvents other than water are hydrocarbon solvents such as iso-propyl alcohol.

The EVOH copolymer solutions described herein may be prepared by adding the at least one EVOH copolymer in the appropriate ratio to water or water and solvent at a sufficient temperature to dissolve the at least one EVOH copolymer. The at least one cross-linking agent and the at least one optional catalyst are then added to the cooled solution. In certain embodiments, the EVOH copolymer solutions described may be prepared by adding the at least one EVOH copolymer in the desired ratio to water or water and solvent at a temperature of about 90° C. to about 95° C. under conditions of agitation for up to two hours or more to dissolve the at least one EVOH copolymer. The solution containing the dissolved at least one EVOH copolymer is then cooled to room temperature. The at least one cross-linking agent and at least one optional catalyst are then added to the cooled solution.

The resulting EVOH copolymer coating solution is then coated onto the film substrate. Generally, it is desirable that the cross-linking of the EVOH copolymer occurs after the coating is applied to the film substrate and is evenly distributed. Typically, this may be accomplished by preparing the aqueous solution so that the initial concentration of solids is too low for cross-linking to occur. Desirably, cross-linking occurs as the coating solution dries and the solids content of the solution increases and the rate of cross-linking also increases.

In certain embodiments, the EVOH copolymer coatings described herein exhibit cross-linking of about 80% to about 100%. In other embodiments, the EVOH copolymer coatings described herein exhibit cross-linking of about 90% to about 100%. In additional embodiments, the EVOH copolymer coatings described herein exhibit cross-linking of about 95% to about 100%. In still other embodiments, the EVOH copolymer coatings described herein exhibit cross-linking of about 100%.

In certain embodiments, the film substrate may be treated with at least one primer to enhance adhesion of the EVOH copolymer coating thereto. Exemplary suitable primers are polyurethane dispersions such as Aqua-Lam 300 (A+C) commercially available from Rohm and Haas and Neorez R600 commercially available from DSM NeoResins. Other exemplary suitable primers are polyethylene imines such as Epomine 1050 commercially available from Nippon Shokubai, Co. Ltd. Primer dispersions and solutions may be applied by any suitable technique, such as by spray coating, to the surface of the film substrate over a wide concentration range. In certain embodiments, the at least one primer is applied at a concentration of about 0.001 $g/m^2$ to about 0.5 $g/m^2$. In other embodiments, the primer is applied at a concentration of about 0.005 $g/m^2$ to about 0.1 $g/m^2$. In additional embodiments, the at least one primer is applied at a concentration of about 0.001 $g/m^2$ to about 0.01 $g/m^2$.

In certain embodiments, the EVOH copolymer solution incorporates from about 2% to about 20% by weight solids of the EVOH copolymer. In other embodiments, the aqueous EVOH solution incorporates from about 4% to about 15% by weight solids of the EVOH copolymers. In additional embodiments, the aqueous EVOH solution incorporates from about 5% to about 10% by weight solids of the EVOH copolymers.

The polymeric substrates to which the coatings are applied may be any single or multi-layer polymeric material that can be formed into a film. The substrate can be transparent or opaque. Additionally, the substrate may be colored or have a matte finish. The opacity of opaque films may be achieved by cavitating, creating voids in one or more layers of the polymeric film substrate, or by other means. For example, cavitation may be achieved through the use of organic or inorganic voiding agents or though production techniques independent of the use of voiding agents.

Exemplary thermoplastic materials include any polyolefin such as polypropylene, polyethylene, polybutene, polystyrene, polyvinyl chloride, propylene containing copolymers, propylene containing terpolymers, ethylene containing copolymers such as ethylene-propylene copolymers, ethylene containing terpolymers such as ethylene-butylene-propylene terpolymers, butene containing copolymers, butene containing terpolymers, and blends thereof. Other suitable film materials include polyethylene terephthalate, other polyesters (including but not limited to polyethylene terephthalate glycol [PETG], polyethylene naphthalate [PEN] and liquid crystalline polymers [LCP]), and nylon, including oriented nylon.

In certain embodiments, the film substrate is comprised of a material selected from the group consisting of polypropylene, copolymers of propylene, polyethylene, copolymers of ethylene, polybutene, copolymers of butene, polystyrene, polyvinyl chloride, polyesters, amorphous polyester, polyethylene terephthalate glycol, polyethylene naphthalate, and oriented nylon. For purposes of this disclosure, the term "copolymer" refers to polymers incorporating two or more different monomer units such as true copolymers, terpolymers, etc.

In multilayer films, one or more skin layers are located on at least one surface of a thermoplastic core layer. Exemplary skin layers comprise polyethylene, including medium and high-density polyethylene, polypropylene, copolymers of propylene and ethylene and terpolymers of propylene, ethylene and butylenes, maleic anhydride, and blends thereof.

The various polymeric substrate layers may contain processing aids or inorganic particulates such as titanium dioxide or void initiating agents to enhance the whiteness or color of the substrate or to enhance antiblocking properties. Exemplary void initiators and techniques are disclosed in U.S. Pat. No. 5,885,721 to Su et al. and U.S. Pat. No. 6,168,826 to Su et al. Exemplary additional additives are slip, antiblock, and antistatic agents that are well known in the art and used to improve substrate functionality and properties. Additionally, as mentioned previously, the substrate may be metallized.

The various polymeric substrate layers described herein may also contain particulate materials such as amorphous silica to reduce the tack of the substrate. Amorphous silica is composed of particles which are agglomerations of smaller particles and which have an average particle size of about 2 to about 9 microns in one embodiment. In another embodiment, the particle size is about 3 to about 5 microns. The silica may be present in the sealable coating in a concentration of about 0.1 to about 2.0 phr in one embodiment. In another embodiment, the concentration is about 0.2 to about 0.4 phr. Other types of particulate materials can be used instead of amorphous silica. Suitable materials include polymethylmethacrylate spherical particles with an average particle size of from about 2 μm to about 6 μm in one embodiment. Such particulates are available under the designations EPOSTAR MA 1002 and EPOSTAR MA 1004 manufactured by Nippon Shokubai Co., LTD and CALIBRE CA 6-6 manufactured by Polymer Systems AS. Also, silicone spherical particles with an average particle size of from about 2 μm to about 6 μm in one embodiment are suitable. Exemplary silicone particles are available under the designation TOSPEARL manufactured by Toshiba Silicone Co., LTD.

The substrate may be a single or multiple layers. For example, the substrate may be a 3-layer polymeric film which comprises a core layer and two outer layers, with the core layer comprising polypropylene. In other embodiments, the substrate may be a 3-layer polymeric film which comprises a core layer and two outer layers, with the core layer comprising polyethylene. In additional embodiments, the substrate may be a 5-layer polymeric film which comprises a core layer, two intermediate layers adjacent to the central core layer, and two outer layers, the polymer of at least one of the intermediate layers can comprise polypropylene.

A particular type of thermoplastic film which can be advantageously used in the substrate is molecularly oriented isotactic polypropylene. After extrusion of the substrate, for example, the base polypropylene film, utilizing conventional extrusion techniques, the film is heated and molecularly oriented by stretching it in both the longitudinal and transverse directions. The resulting oriented film exhibits greatly improved tensile and stiffness properties. Typically polyolefin resins, such as polypropylene, are extruded through a flat sheet extruder die at a temperature ranging from between about 200° C. to about 250° C., casting the film onto a cooling drum and quenching the film. The sheet is then stretched about 3 times to about 7 times in the machine direction (MD) orienter followed by stretching about 5 times to about 10 times in the transverse direction (TD) orienter.

The substrates in accordance with this disclosure may be oriented or hot-blown films made from any of a number of processes. The oriented films may be manufactured in a variety of processes including biaxial orientation, machine direction orientation (MDO), double bubble, simultaneous longitudinal and transverse orientation (LISIM®), tape bubble, trapped bubble, or tenter framing. The use of linear motors to directly propel tenter clips to effect simultaneous longitudinal and transverse orientation is disclosed in U.S. Pat. No. 4,853,602 to Hommes et al. Hot-blown films are typically manufactured in a simple bubble process.

In certain embodiments, the film substrate includes a material selected from the group consisting of oriented polyolefin film, biaxially oriented polyolefin film and cast polyolefin film. In other embodiments, the film substrate includes a material selected from biaxially oriented polypropylene film, biaxially oriented polyethylene film, and combinations thereof.

In certain embodiments, the EVOH copolymer coating described herein is applied to a first surface of the film substrate and the second surface of the film substrate is provided with a functional layer. For purposes of this disclosure, the term functional layer refers to film layers that are printable, cold sealable, heat sealable, suitable for coating, and/or suitable for laminating to another structure. In certain embodiments, the functional layer is sealable. In other embodiments, the functional layer is printable. In particular embodiments, the functional layer may be provided by treatments such as corona, flame, and plasma treatments or coatings such as acrylic coatings, low temperature seal coatings, and PVdC coatings.

The EVOH copolymer solution may be applied in any suitable manner such as by gravure coating, roll coating, dipping, spraying, etc. Squeeze rolls, doctor knives, etc., are useful to remove the excess coating solution. The coating compositions will ordinarily be applied in such an amount that there will be deposited, following drying, to remove the at least one solvent in the coating solution, to provide a smooth, evenly distributed layer of coating from about 0.2 g/m$^2$ to about 3 g/m$^2$ of film surface in one embodiment. In another embodiment, the coating is applied at a concentration of about 0.4 g/m$^2$ to about 2 g/m$^2$. In still another embodiment, the concentration is from about 0.5 g/m$^2$ to about 1.5 g/m$^2$. In general, the thickness of the applied coating is such that it is sufficient to impart, the desired water vapor and oxygen barrier properties.

The coating, once applied to the film substrate may be dried by hot air, radiant heat or by any other suitable means thereby providing a non-water soluble, adherent, glossy coated film product useful, for example, as a packaging film. As discussed above, in certain embodiments, once applied, the EVOH copolymer coatings described herein exhibit cross-linking of about 80% to about 100%. In other embodiments, the EVOH copolymer coatings described herein exhibit cross-linking of about 90% to about 100%. In additional embodiments, the EVOH copolymer coatings described herein exhibit cross-linking of about 95% to about 100%.

The coated films described herein may include at least one metallized layer. The metallized layer may be a metallic layer or coating that is typically applied by vapor deposition methods. U.S. Pat. No. 5,487,940 to Bianchini et al. and U.S Pat. No. 6,420,041 to Amon et al. describe and refer to numerous exemplary metallized films. Metal layers are well known in the packaging industry and can be deposited using any known method, for instance, vacuum deposition, electroplating, sputtering, etc. Preferably, the metal layer is one of vacuum deposited aluminum, copper, silver, chromium, gold, and mixtures thereof, with vacuum deposited aluminum being the most commonly used.

In certain embodiments, particularly embodiments in which water vapor barrier properties are desired, a metallized layer is provided adjacent to the EVOH copolymer coating. In certain embodiments, the metallic layer is provided at a concentration or thickness sufficient to provide an optical density of the metal layer alone of about 2 to about 3 (or from about 1.0% to about 0.1% light transmission). In other embodiments, the metallic layer is provided at a concentration or thickness sufficient to provide an optical density of the metal layer alone of about 2.5 to about 3. In additional embodiments, the metallic layer is provided at a concentration or thickness sufficient to provide an optical density of the metal layer alone of about 2.5 to about 2.8.

In certain embodiments, the EVOH copolymer coated films described herein, which do not include a metallized layer adjacent to the EVOH copolymer coating, exhibit oxygen transmission rates ("OTR") of about 0.02 cc/m$^2$/d to about 0.8 cc/m$^2$/d at 0% relative humidity ("RH"). In other embodiments, the EVOH copolymer coated films described herein, which do not include a metallized layer adjacent to the EVOH copolymer coating, exhibit OTR values of about 0.02 cc/m$^2$/d to about 0.5 cc/m$^2$/d at 0% RH. In additional embodiments, the EVOH copolymer coated films described herein, which do not include a metallized layer adjacent to the EVOH copolymer coating, exhibit OTR values of about 0.02 cc/m$^2$/d to about 0.4 cc/m$^2$/d at 0% RH.

In certain embodiments, the EVOH copolymer coated films described herein, which include at least one metallized layer adjacent to the EVOH copolymer coating, exhibit OTR values of about 0.02 cc/m$^2$/d to about 0.8 cc/m$^2$/d at 0% RH. In other embodiments, the EVOH copolymer coated films described herein, which include at least one metallized layer adjacent to the EVOH copolymer coating, exhibit OTR values of about 0.02 cc/m$^2$/d to about 0.2 cc/m$^2$/d at 0% RH. In additional embodiments, the EVOH copolymer coated films described herein, which include at least one metallized layer adjacent to the EVOH copolymer coating, exhibit OTR values of about 0.02 cc/m$^2$/d to about 0.1 cc/m$^2$/d at 0% RH. In still other embodiments, the EVOH copolymer coated films described herein, which include at least one metallized layer adjacent to the EVOH copolymer coating, exhibit OTR values of about 0.02 cc/m$^2$/d to about 0.05 cc/m$^2$/d at 0% RH.

In certain embodiments, the EVOH copolymer coated films described herein, which include at least one metallized layer adjacent to the EVOH copolymer coating, exhibit OTR values of about 0.03 cc/m$^2$/d to about 0.8 cc/m$^2$/d at 90% RH.

In other embodiments, the EVOH copolymer coated films described herein, which include at least one metallized layer adjacent to the EVOH copolymer coating, exhibit OTR values of about 0.03 cc/m²/d to about 0.4 cc/m²/d at 90% RH. In additional embodiments, the EVOH copolymer coated films described herein, which include at least one metallized layer adjacent to the EVOH copolymer coating, exhibit OTR values of about 0.03 cc/m²/d to about 0.2 cc/m²/d at 90% RH. In still other embodiments, the EVOH copolymer coated films described herein, which include at least one metallized layer adjacent to the EVOH copolymer coating, exhibit OTR values of about 0.03 cc/m²/d to about 0.08 cc/m²/d at 90% RH.

In certain embodiments, the EVOH copolymer coated films described herein, which include at least one metallized layer adjacent to the EVOH copolymer coating, exhibit OTR values of about 0.3 cc/m²/d to about 0.8 cc/m²/d at 100% RH. In other embodiments, the EVOH copolymer coated films described herein, which include at least one metallized layer adjacent to the EVOH copolymer coating, exhibit OTR values of about 0.3 cc/m²/d to about 0.6 cc/m²/d at 100% RH. In additional embodiments, the EVOH copolymer coated films described herein, which include at least one metallized layer adjacent to the EVOH copolymer coating, exhibit OTR values of about 0.3 cc/m²/d to about 0.4 cc/m²/d at 100% RH.

In certain embodiments, the negative effects of high RH environments on OTR properties of EVOH copolymer coated films described herein are reversed upon removing the film from the high RH environment. In other words, EVOH copolymer coated films that exhibit high OTR values in a high RH environment may later exhibit low OTR values when tested in a low RH environment.

In certain embodiments, the EVOH copolymer coated films described herein, which include at least one metallized layer adjacent to the EVOH copolymer coating, exhibit water vapor transmission rates ("WVTR") of about 0.03 g/m²/d to about 0.8 g/m²/d at 90% RH. In other embodiments, the EVOH copolymer coated films described herein, which include at least one metallized layer adjacent to the EVOH copolymer coating, exhibit WVTR values of about 0.03 g/m²/d to about 0.4 g/m²/d at 90% RH. In additional embodiments, the EVOH copolymer coated films described herein, which include at least one metallized layer adjacent to the EVOH copolymer coating, exhibit WVTR values of about 0.03 g/m²/d to about 0.2 g/m²/d at 90% RH. In still other embodiments, the EVOH copolymer coated films described herein, which include at least one metallized layer adjacent to the EVOH copolymer coating, exhibit WVTR values of about 0.03 g/m²/d to about 0.08 g/m²/d at 90% RH.

In certain embodiments, the EVOH copolymer coated films described herein, which include at least one metallized layer adjacent to the EVOH copolymer coating, exhibit WVTR values of about 0.3 g/m²/d to about 0.8 g/m²/d at 100% RH. In other embodiments, the EVOH copolymer coated films described herein, which include at least one metallized layer adjacent to the EVOH copolymer coating, exhibit WVTR values of about 0.3 g/m²/d to about 0.6 g/m²/d at 100% RH. In additional embodiments, the EVOH copolymer coated films described herein, which include at least one metallized layer adjacent to the EVOH copolymer coating, exhibit WVTR values of about 0.3 g/m²/d to about 0.4 g/m²/d at 100% RH.

In certain embodiments, the coated films described herein incorporating at least one metallized layer adjacent to the EVOH copolymer coating exhibit WVTR values of about 0.03 g/m²/d to about 0.4 g/m²/d at 90% RH and OTR values of 0.02 cc/m²/d to 0.2 cc/m²/d at 0% RH. In other embodiments, the coated films described herein incorporating at least one metallized layer adjacent to the EVOH copolymer coating exhibit WVTR values of about 0.03 g/m²/d to about 0.2 g/m²/d at 90% RH and OTR values of 0.02 cc/m²/d to 0.1 cc/m²/d at 0% RH. In additional embodiments, the coated films described herein incorporating at least one metallized layer adjacent to the EVOH copolymer coating exhibit WVTR values of about 0.03 g/m²/d to about 0.08 g/m²/d at 90% RH and OTR values of 0.02 cc/m²/d to 0.08 cc/m²/d at 0% RH.

Another advantage that may be observed in connection with the EVOH copolymer coated films described herein is the steadfastness of the EVOH copolymer coating. With regard to conventional EVOH copolymer coatings, it is observed that such coatings may be easily wiped from the surface of a polymeric film substrate by applying a solvent, such as water, isopropyl alcohol, or methyl ethyl ketone, to a cloth and wiping across the surface of the coating. In contrast, with regard to the EVOH copolymer coated films as described herein, the coatings will not wipe from the surface of the polymeric substrate using these procedures. While not wishing to be bound thereby, it is believed that this steadfastness of the EVOH copolymer coatings described herein is due to beneficial effects of the cross-linking. Conventional EVOH copolymer coatings subjected to the same procedures are disturbed as evidenced by partial or total removal of the conventional EVOH copolymer coatings.

The following examples are illustrative of specific embodiments of the EVOH copolymer coated films of the present disclosure. All parts and percentages are by weight unless otherwise noted.

Experimental Evaluations

A series of experimental evaluations were conducted to compare the properties of EVOH copolymer coated films as described herein to comparative film structures.

An EVOH copolymer coating solution was prepared by starting with an aqueous solution of an EVOH copolymer purchased commercially from Kuraray Co., Ltd under the designation Exceval AQ 4105. The copolymer had a viscosity of 5 to 7 mPas at 4% solids, and is referred to as having an ethylene content of 10 mol % to 12 mol % and a degree of hydrolysis of 98% to 99%. The EVOH copolymer was provided commercially in a 100% aqueous solution at a 7% solids by weight concentration. The finished coating solution was prepared by mixing 100 phr of the EVOH copolymer in solution, 20 phr of Cymel Parez as a cross-linker, and phosphoric acid as catalyst at a concentration sufficient to provide a finished EVOH copolymer coating solution having a pH of 2.8.

A Comparative Film A was prepared. The Exceval AQ 4105 EVOH copolymer solution referred to above was gravure coated on the surface of a 28 μm thick coextruded biaxially oriented film substrate including a cavitated polypropylene core layer using gravure coating methods. The approximately 25 μm core layer was produced from a polypropylene having a 0.902 density and commercially available from ExxonMobil Chemical Company under the designation of 4612E. A 1 to 1.5 μm functional skin produced from an ethylene-propylene copolymer commercially available from Chisso under the designation of 7794 was adjacent to a first surface of the core layer. The Exceval AQ 4105 EVOH copolymer solution was coated at a coat weight of 0.5 g/m² onto a medium density polyethylene 0.075 to 1.25 μm skin layer, commercially available from Equistar under the designation 6030, adjacent to the second surface of the core layer. An aluminum layer was vapor deposited on top of the EVOH copolymer coating to obtain an aluminum optical density of the metal of 2.8. The resulting coated metallized film is referred to herein as Film A.

Film B was prepared in the same manner as Film A except that instead of the Exceval AQ 4105 EVOH copolymer solution, the film was coated with the finished EVOH copolymer solution containing the cross-linker and acid catalyst described above. The finished coating was applied at a coat weight of 0.5 g/m². The coated film exhibited 100% cross-linking as evidenced by resistance to removal of the coating by rubbing with a solvent-containing cloth.

Comparative Film C was produced by coextruding an approximately 32 μm thick polypropylene core layer, a <1 μm thick layer of maleic anhydride on a first surface of the core layer, and a <0.5 μm thick layer of an EVOH copolymer having an ethylene content of 48 mol % on the second surface of the core layer. The polypropylene had a 0.902 density and is commercially available from ExxonMobil Chemical Company under the designation of 4612E. The maleic anhydride polymer is commercially available from Mitsui Petrochemical Industries, Ltd. under the designation Admer 1179 A. The EVOH copolymer is commercially available from Kuraray Co, Ltd. under the designation EVAL G 176 B.

Comparative Film D was a metallized three layer biaxially oriented film substrate having a polyethylene skin layer with a thickness of 0.5 μm on a 21 μm thick propylene homopolymer core layer. The high density polyethylene resin is commercially available from Equistar under the designation M 6030. The high density polyethylene film layer was metallized by vacuum deposition to an optical density of 2.4 to 2.8 for the metal layer. The propylene core resin has 0.902 density and is commercially available from Atofina under the designation 3371.

Comparative Film E was prepared by gravure coating a PVOH polymer solution on a 0.75 to 1.25 μm thick ethylene-propylene copolymer layer on a propylene film substrate. The PVOH polymer had a degree of hydrolysis of >90% and is commercially available from Michelman, Inc. under the designation EE 90508. The PVOH coating solution was prepared by cross-linking with 20 phr Parez 707 and the addition of phosphoric acid at a concentration sufficient to provide a pH of 2.8. It is noted that this coating is the same as the coating disclosed in Example 8 of U.S. Pat. No. 6,444,750 to Touhsaent. The PVOH polymer solution was coated at a coat weight of 0.9 g/m². An aluminum layer was vapor deposited onto the top of the PVOH copolymer coating using an optical density of 2.8. The propylene film substrate was produced by biaxial orientation from a propylene having a 0.902 density, commercially available from Atofina under the designation 3376.

Comparative Film F was prepared by gravure coating an aqueous PVdC copolymer solution at 26% solids on a biaxially oriented film substrate having a 0.75 to 1.25 μm thick skin layer produced from an ethylene-propylene copolymer commercially available from Atofina under the designation 8573 on a first surface of a 19 μm polypropylene core layer. The core layer was produced from a polypropylene having a 0.902 density, commercially available from Atofina under the designation 3376. The PVdC copolymer is commercially available from W. R. Grace under the designation Daran 8500. The PVdC copolymer solution was coated at a coat weight of 4.5 g/m². An aluminum layer was vapor deposited onto the top of the EVOH copolymer coating to obtain a metal layer optical density of 2.8. A 1 to 1.5 μm thick second skin layer produced from an ethylene-propylene copolymer commercially available from Atofina under the designation 8573 was provided on the second surface of the core layer.

The water vapor barrier properties and oxygen barrier properties of coated Films A-F were evaluated. For control purposes, the water vapor barrier ("WVTR") and oxygen barrier properties ("OTR") of the uncoated films substrates used to produce Films A-F were also evaluated. The OTR values were evaluated at 0% and 80% relative humidity ("RH"). The barrier properties were evaluated before and after passing the films over a shape forming anvil of a form/fill/seal packaging machine. The barrier properties were tested according to procedures: ASTM F-1249 for WVTR and ASTM B-3985 for OTR.

The barrier properties of the various films determined using these testing methods are reported in Table I.

TABLE I

| | WVTR g/(m² day)[1] | | | | OTR cc/(m² day)[1] | | | |
|---|---|---|---|---|---|---|---|---|
| Film Designation | Metallized Film (90% RH) | Metallized Film (100% RH) | Laminate Film before* Anvil | Laminate Film after* Anvil | Metallized Film 0% RH | Metallized Film 80% RH | Laminate Film before* Anvil | Laminate Film after* Anvil |
| A | 0.11 | 0.47 | 0.12 | 0.14 | 0.21 | 0.18 | <0.10 | 0.17 |
| B | 0.03 | 0.4 | 0.21 | 0.18 | 0.10 | 0.10 | <0.10 | <0.10 |
| C | NA | 0.3 | 0.08 | 0.18 | 0.07 | 0.07 | <0.07 | <0.06 |
| D | NA | 0.23 | 0.05 | 0.11 | 26 | 26 | 4.9 | 20 |
| E | NA | 1.38 | 1.61 | 2.2 | 0.10 | 0.90 | 0.4 | 1.7 |
| F | NA | 1.8 | 0.48 | 0.8 | 4.7 | 4.7 | 0.3 | 1.5 |

[1]For U.S. unit (/100 in²), multiply by 0.0645.
*laminated to a 3-layer EP/PP/HDPE substrate As seen by comparing these Examples, the coatings incorporating a cross-linked EVOH copolymer exhibited beneficial water vapor and oxygen barrier properties over a broad range of relative humidity levels. Film B has much lower WVTR after metallization than Film A and maintains its OTR properties after exposure to high humidity. Film B also has superior OTR and WVTR properties as compared to Films D, E, and F, demonstrating that the cross-linked EVOH coating provides much improved barrier protection. Film B has comparable barrier to Film C incorporating a solid layer of an EVOH copolymer rather than a coating of an EVOH copolymer.

In another series of experimental evaluations, a coated EVOH copolymer film as described herein and four comparative films were produced and evaluated. Specifically, the oxygen barrier properties of the various films produced were tested at various relative humidity levels ranging from 0% relative humidity to 100% relative humidity. The barrier properties were tested according to procedures: ASTM F-1249 for WVTR and ASTM B-3985 for OTR.

Comparative Film G was the same as Comparative Film C.

Comparative Film H was produced in the same manner as Comparative Film A except the coating incorporated 5 wt. % of an ethylene acrylic acid copolymer commercially available form Michelman, Inc. under the designation Michelprime 4983.15 at 25% solids and no phosphoric acid. The coating was applied at a coat weight of 0.5 g/m$^2$.

Film I was prepared in the same manner as Film H except that the film was coated with the finished EVOH copolymer solution containing the cross-linker and acid catalyst described above. The finished coating was applied at a coat weight of 0.5 g/m$^2$.

Film J was prepared in the same manner as Film I except the coating contained no cross-linker, although the coating contained the phosphoric acid component.

Comparative Film K was prepared in the same manner as Film H except that the film was coated with the Exceval AQ 4105 EVOH copolymer solution.

FIG. 1 reports the data collected from the oxygen transmission rates for the different films as well as providing a graph of the reported oxygen transmission rates at the different relative humidities.

As seen by reference to FIG. 1, the cross-linked EVOH copolymer coated Film I exhibited good barrier resistance to oxygen even at relative humidities of 75% and higher. In contrast the Comparative films exhibited less resistance to oxygen at relative humidity levels of 75% and higher. Comparing Film I to Films J and K, Film I retained much better OTR properties above 75% RH than Films J and K.

Importantly, Film I exhibited superior barrier properties even in comparison to Film G incorporating the coextruded EVOH layer. To more clearly observe the superior barrier properties of Film I over Film G, FIG. 2 provides an isolated comparison of the barrier properties of Films G and I.

Figure 2:
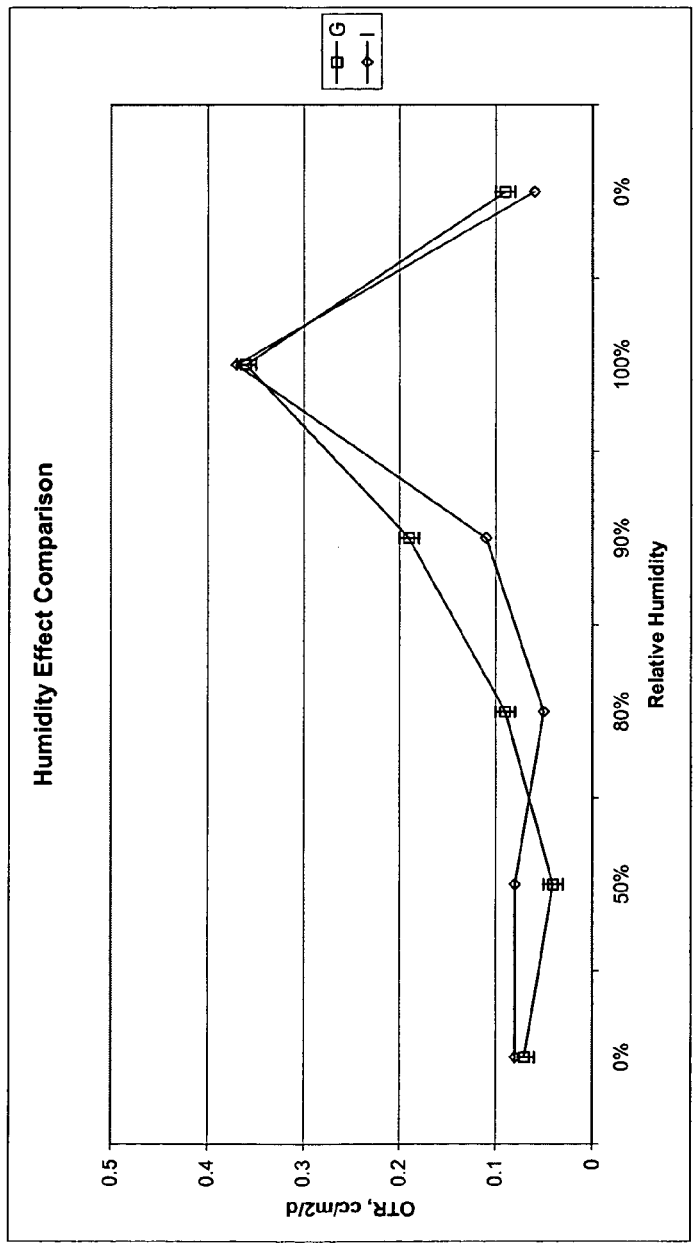
FIG. 2 provides an isolated comparison of the barrier properties of Films G and I.

By reference to the second set of data points at 0% RH in FIG. 1 and FIG. 2, it is observed that the negative effects of high RH environments on OTR properties of EVOH copolymer coated films described herein may be reversed upon removing the film from the high RH environment.

Figure 3:
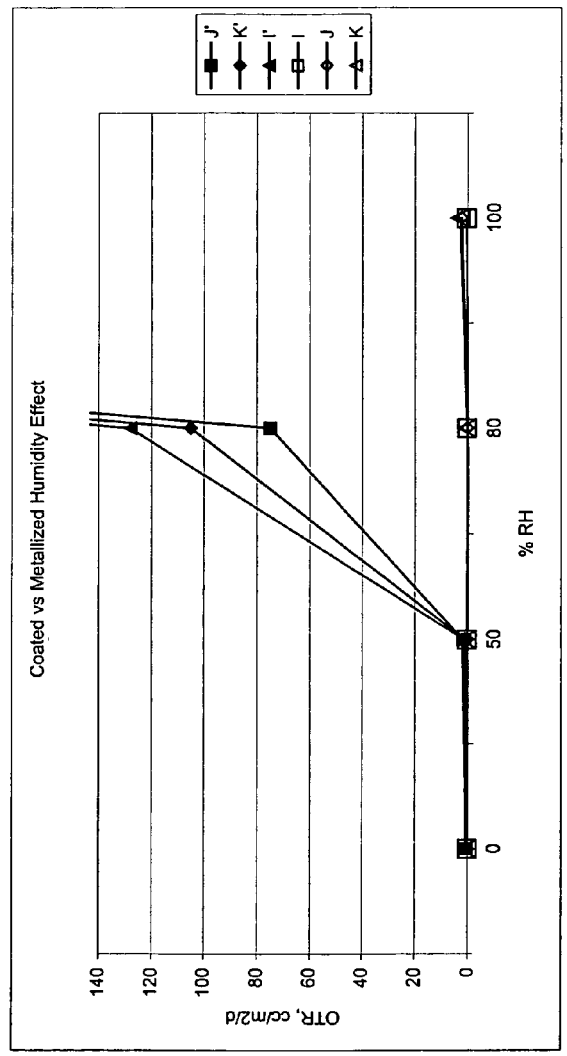
FIG. 3 exhibits barrier resistance to oxygen verse relative humidities for the different films.

As seen by reference to FIG. 3, the metallized cross linked EVOH copolymer coated Film I exhibited good barrier resistance to oxygen even at relative humidities of 75% and higher. Films I', J', and K' are the coated but unmetallied version of Films I, J, and K. In contrast, without metallization the Comparative Films I', J', and K', exhibited less resistance to oxygen at relative humidity levels of 75% and higher. Comparing Film I to Films J and K, Film I retained much better OTR properties above 75% RH than Films J or K.

The stability of certain cross-linked EVOH copolymer coating solutions as described herein was also evaluated. An EVOH copolymer having an ethylene content of greater than 10 mol % and a degree of hydrolysis of at least 98% was dissolved in water at a temperature of 90° C. to 95° C. to produce an 100% aqueous EVOH copolymer solution without a cross-linker with a solids content of 7%. A portion of the aqueous EVOH copolymer solution was mixed in portions of 100 phr of the aqueous EVOH copolymer solution, 20 phr of Cymel Parez as a cross-linker, and phosphoric acid as catalyst at a concentration sufficient to provide a finished EVOH copolymer coating solution incorporating having a pH of 2.8. The resulting aqueous solution incorporating the cross-linker had a solids content of 6.5%. The aqueous solution without the cross-linker had a viscosity of 18 cps at 22° C. to 25° C. and the aqueous solution containing the cross-linker and catalyst had a viscosity of 10.5 cps at 22° C. to 25° C. Both aqueous solutions were stored in plastic totes, without agitation, at 22° C. to 25° C. The initial viscosity of each solution was tested using a Brookfield viscometer and then re-tested after 5 days, 14 days, 21 days, and 77 days of storage. The viscosity (cps) of each solution at each of these intervals is reported in Table II.

TABLE II

|  | No cross-linker | Cross-linker |
| --- | --- | --- |
| 0 days | 18 | 10.5 |
| 5 days | 18 | 11 |
| 14 days | 41 | 11.5 |
| 21 days | 2250 | 14 |
| 77 days | Gel | 13 |

With reference to Table II, it is seen that the EVOH copolymer coating solutions described herein exhibit storage stability over long periods of time. The storage stability is dramatically increased over the aqueous EVOH copolymer solution without a cross-linker.

All patents and publications referred to herein are hereby incorporated by reference in their entireties.

Although the present invention and its advantages have been described in detail, it should be understood that various changes, substitutions, and alterations could be made without departing from the spirit and scope of the invention as defined by the following claims.

What is claimed is:

1. A method of coating a polymeric film substrate comprising: (i) coating at least one surface of the film substrate with a coating solution comprising at least one solvent which comprises water, 100 phr by weight of at least one ethylene vinyl alcohol copolymer and from about 0.1 phr to about 25 phr by weight of at least one cross-linking agent and (ii) drying the coating solution coated on the at least one surface of the substrate to remove at least a portion of the at least one solvent to provide a cross-linked coating layer on the at least one surface of the film substrate at a concentration of about 0.2 g/m$^2$ to about 3 g/m$^2$, wherein prior to being cross-linked the at least one ethylene vinyl alcohol copolymer has: (a) a solubility in the solvent; (b) from about 80 mol % to about 95 mol % of vinyl alcohol units and from about 5 mol % to about 20 mol % of the ethylene derived units; (c) a degree of hydrolysis of about 75% to about 100%; (d) a degree of polymerization of about 300 to about 4,000 and a number average molecular weight of about 13,300 to about 400,000; (e) a viscosity of between about 3 cps and about 40 cps at 4% solids and 20° C. and a pH of 4 to 7.5; and (f) repeating units derived from ethylene and vinyl alcohol.

2. The method of claim 1, wherein the coating solution is 100% aqueous.

3. The method of claim 1, wherein the coating solution further comprises a cross-linking catalyst.

4. The method of claim 1, wherein the barrier coating is present on at least one of the first and second surfaces at a concentration of from about 2 g/m$^2$ to about 3 g/m$^2$ and the barrier coating is cross-linked from about 90% to about 100%.

5. The method of claim 1, wherein the film substrate is comprised of a material selected from the group consisting of polypropylene, copolymers of propylene, polyethylene, copolymers of ethylene, polybutene, copolymers of butene, polystyrene, polyvinyl chloride, polyesters, amorphous polyester, polyethylene terephtalate glycol, polyethylene naphthalate, and oriented nylon.

6. The method of claim 1, wherein the film substrate is comprised of a material selected from the group consisting of oriented polyolefin film, biaxially oriented polyolefin film, cast polyolefin film, and biaxially oriented polypropylene film.

7. The method of claim 1, wherein the film substrate is opaque.

8. The method of claim 1, wherein the film substrate is transparent.

9. The method of claim 1, wherein the film substrate is pigmented.

10. The method of claim 1, wherein the film substrate of the film is comprised of at least three layers.

11. The method of claim 1, wherein at least one layer of the film substrate is voided.

12. The method of claim 1, wherein said film further comprises a metallized layer adjacent to the barrier coating.

13. The method of claim 12, wherein the film has a water vapor transmission rate of about 0.03 $g/m^2/d$ to about 0.8 $g/m^2/d$ at 90% relative humidity.

14. The method of claim 1, wherein the film has an oxygen transmission rate of about 0.02 $cc/m^2/d$ to about 0.8 $cc/m^2/d$ at 0% relative humidity.

15. The method of claim 12, wherein the film has a water vapor transmission rate of about 0.03 $g/m^2/d$ to about 0.4 $g/m^2/d$ at 90% relative humidity and wherein the film has an oxygen transmission rate of 0.02 $cc/m^2/d$ to 0.2 $cc/m^2/d$ at 0% relative humidity.

16. The method of claim 1, wherein the baffler coating is on the first surface of the film substrate and the second surface of the substrate comprises a functional film layer.

* * * * *